(12) United States Patent
Leech et al.

(10) Patent No.: US 7,527,550 B1
(45) Date of Patent: May 5, 2009

(54) MEAT PROCESSING SYSTEM

(75) Inventors: Les D. Leech, Fremont, NE (US); Steve L. Kaufman, Fremont, NE (US); Koichi Tsuchiyama, Fremont, NE (US); Joe A. Bird, Fremont, NE (US)

(73) Assignee: Fremont Beef Company, Fremont, NE (US)

( * ) Notice: Subject to any disclaimer, the term of this patent is extended or adjusted under 35 U.S.C. 154(b) by 0 days.

(21) Appl. No.: 11/977,988

(22) Filed: Oct. 26, 2007

(51) Int. Cl.
*A22C 17/08* (2006.01)
(52) U.S. Cl. .......................................... 452/173; 452/81
(58) Field of Classification Search ............. 452/78–81, 452/123, 173; 426/506; 99/516, 534, 536
See application file for complete search history.

(56) References Cited

U.S. PATENT DOCUMENTS

| | | | | |
|---|---|---|---|---|
| 1,876,676 A | * | 9/1932 | Hill | 452/123 |
| 3,240,026 A | * | 3/1966 | Van Dolah et al. | 62/63 |
| 3,729,773 A | * | 5/1973 | Dillon | 426/524 |
| 5,178,890 A | * | 1/1993 | van den Nieuwelaar et al. | 426/332 |
| 5,939,115 A | * | 8/1999 | Kounev et al. | 426/238 |
| 6,946,080 B2 | * | 9/2005 | Perkins et al. | 210/754 |
| 7,217,437 B2 | * | 5/2007 | Van Stuyvenberg | 426/644 |
| 2005/0181720 A1 | * | 8/2005 | Osborn et al. | 452/173 |

* cited by examiner

*Primary Examiner*—David J Parsley
(74) *Attorney, Agent, or Firm*—Dennis L. Thomte; Thomte Patent Law Office LLC

(57) ABSTRACT

An apparatus for processing meat comprising an endless conveyor having an infeed end and a discharge end with the conveyor passing through a housing or tank which is partially filled with agitated water. Pieces of meat are conveyed by the conveyor through the agitated water to remove foreign particles therefrom. The foreign particles are recirculated through a filter and a water chiller with the chilled and filtered water then being returned to the tank. Excess water is blown from the pieces of meat after the pieces of meat have been conveyed through the agitated water. The method of processing the meat is also described.

8 Claims, 6 Drawing Sheets

MEAT PROCESSING SYSTEM

BACKGROUND OF THE INVENTION

1. Field of the Invention

This invention relates to a meat processing system and more particularly to a system wherein pieces of meat are conveyed through a wash tub or housing with the conveyed meat being immersed in agitated chilled water so that foreign material such as bone chips, blood clots and skin are removed from the pieces of meat.

2. Description of the Related Art

In many meat processing plants, portions or pieces of meat are first severed from an animal carcass and are then further processed downstream in the plant for particular uses. During the severing process of the meat from the carcass, bone chips which may result from the severing process may cling to the exterior of the piece of meat. Further, undesirable blood clots and pieces of skin may adhere to the piece of meat. Usually, the foreign materials adhering to the piece of meat must be manually removed therefrom which is a time consuming and labor intensive task. This is especially true in those processing plants where "picnics" are cut from hog carcasses and are then processed into meat products such as sausage or the like.

SUMMARY OF THE INVENTION

A method and means for processing pieces of meat is disclosed wherein the apparatus for processing the pieces of meat comprises an elongated housing having a first end and a second end with the housing including a bottom wall and horizontally spaced-apart side walls extending upwardly from the bottom wall. The housing is filled to a pre-determined level with chilled water. An endless conveyor is movably mounted in the housing which extends between the first and second ends of the housing. The conveyor includes at least first, second and third conveyor portions. Each of the first and third conveyor portions are inclined and have upper and lower ends. The second conveyor portion is generally horizontally disposed and has first and second ends.

The first conveyor portion of the endless conveyor extends from the first end of the housing towards the second end of the housing. The upper end of the first conveyor portion is positioned above the level of water in the housing with the lower end of the first conveyor portion being positioned below the level of water in the housing. The second conveyor portion extends from the lower end of the first conveyor portion towards the second end of the housing beneath the level of water in the housing. The third conveyor portion extends upwardly from the second end of the second conveyor portion towards the second end of the housing. The lower end of the third conveyor portion is positioned below the level of water in the housing. The upper end of the third conveyor portion is positioned above the water level in the housing.

The conveyor is movable so that meat placed on the upper end of the first conveyor portion will be conveyed downwardly into the water in the housing by the first conveyor portion, thence conveyed through the water in the housing by the second conveyor portion, and thence upwardly from the water in the housing by the third conveyor portion.

A water agitator is associated with the housing to agitate the water therein so as to remove foreign material such as bone chips, blood clots or skin from the pieces of meat being conveyed through the water in the housing. The meat processing system includes a water recirculator which recirculates chilled water through the housing. The water in the housing is agitated by means of water and/or air nozzles which direct pressurized water and/or air into the housing so that the meat being conveyed by the conveyor will pass through the agitated water in the housing. The system also includes an air blower positioned above the third conveyor below the upper end thereof which blows excess water from the meat after the meat has moved upwardly from the water in the housing.

It is therefore a principal object of the invention to provide an improved meat processing system.

A further object of the invention is to provide a meat processing system wherein pieces of meat are conveyed through agitated, chilled water so that the agitated water removes bone chips, blood clots and skin from the meat being conveyed through the water.

Still another object of the invention is to provide a meat processing system including a water recirculation means which further includes a filter to filter out the foreign material which has been removed from the pieces of meat being processed.

Still another object of the invention is to provide a method and means for processing meat which eliminates the need for manually removing foreign material from the pieces of meat being processed.

Still another object of the invention is to provide a system of the type described which is economical of manufacture, efficient and durable in use.

These and other objects will be apparent to those skilled in the art.

DETAILED DESCRIPTION OF THE INVENTION

Figure 1:
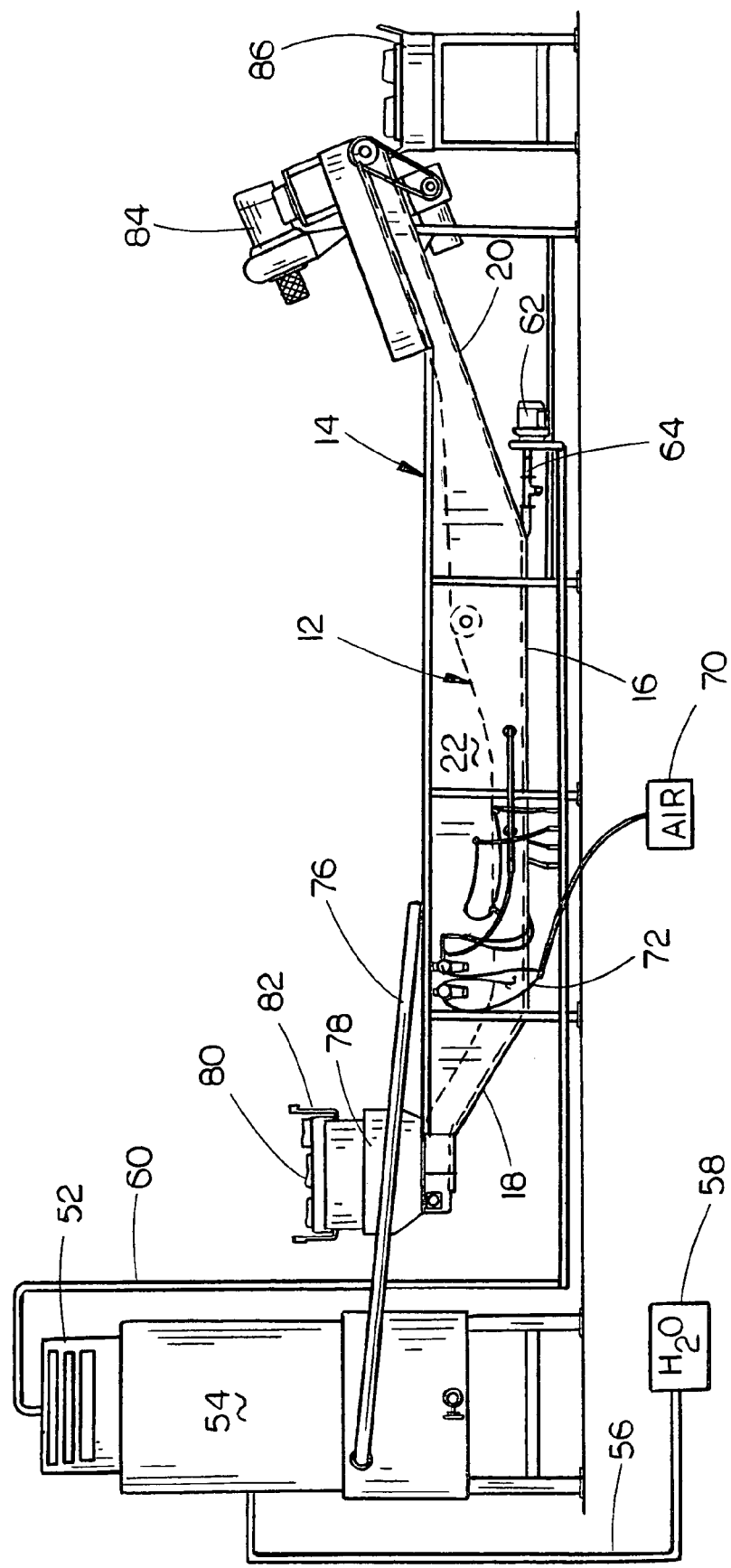
FIG. 1 is a side elevational view of the meat processing system of this invention.
Figure 2:
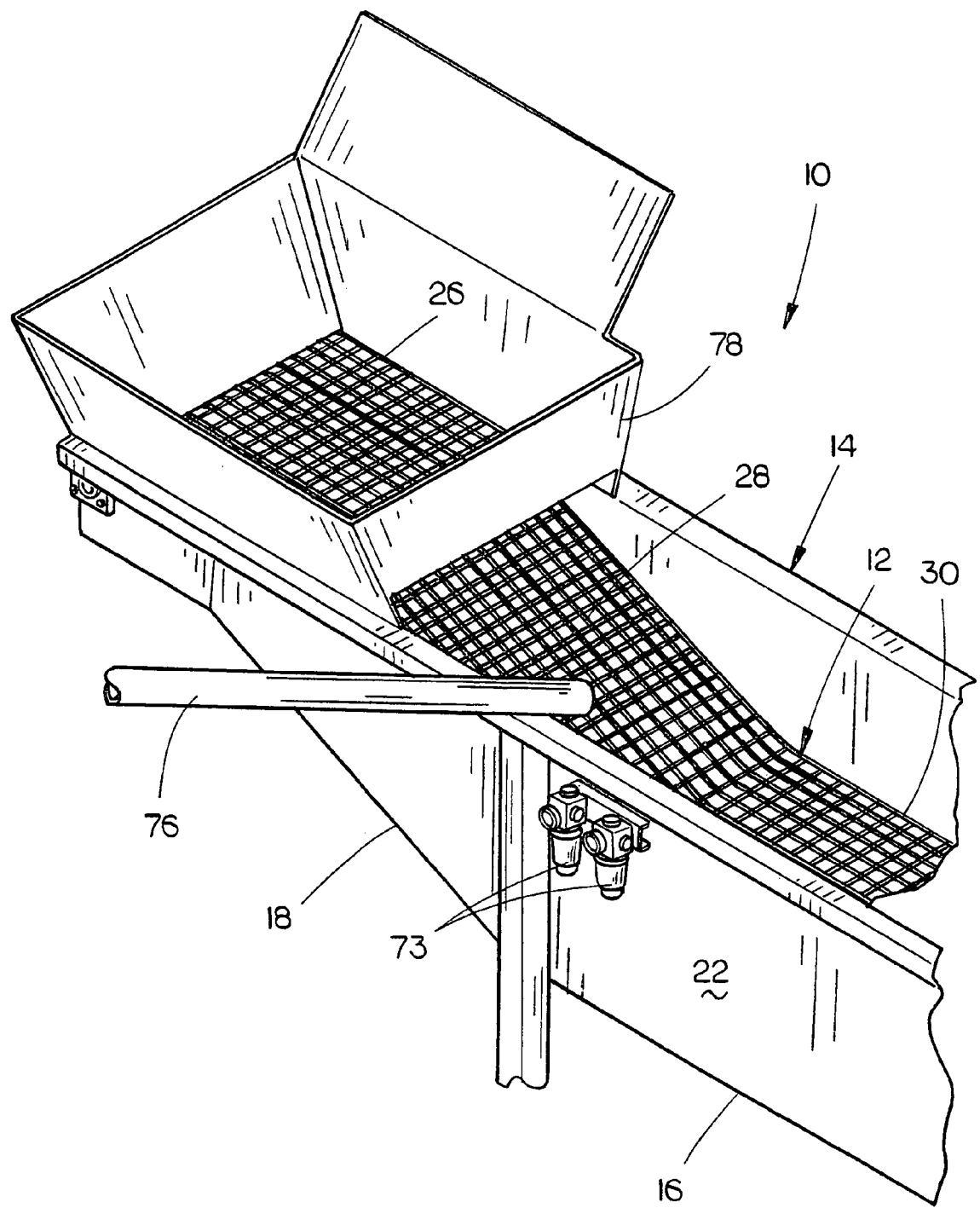
FIG. 2 is a partial perspective view of the meat inlet end of the meat conveyor of the system.
Figure 3:
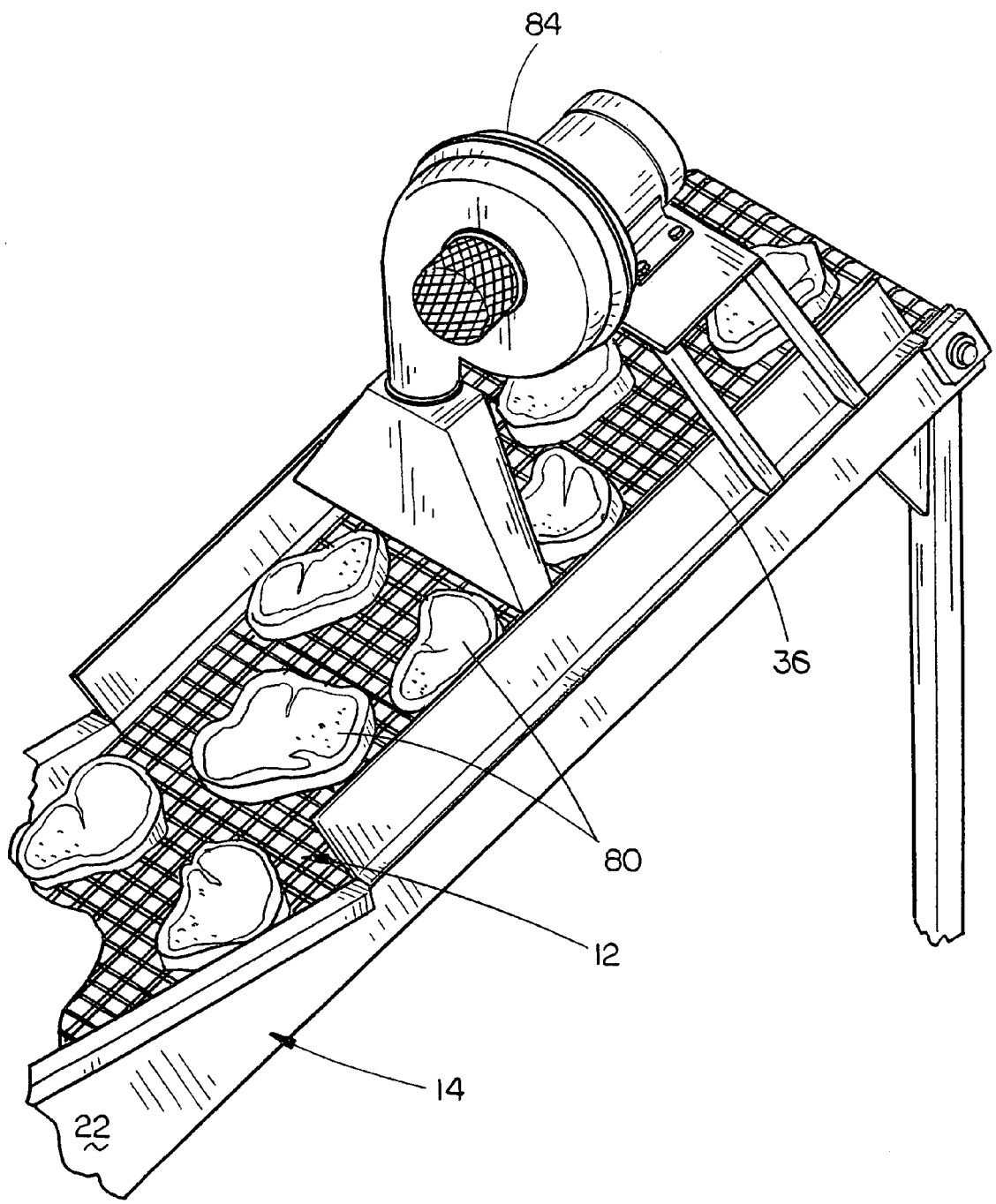
FIG. 3 is a partial perspective view of the meat discharge end of the meat conveyor of the system.

The meat processing system of this invention is referred to generally by the reference numeral 10. System 10 includes a conveyor 12 which is positioned within a housing or tank 14. Housing 14 includes a bottom 16, inclined end walls 18 and 20, and side walls 22 and 24. Conveyor 12 is of the endless type and is preferably constructed of a linked plastic material which creates openings 25 therein which make the cleaning of the same more efficient.

Although conveyor 12 is of the endless type, conveyor 12 will be described as including a first conveyor portion 26, a second conveyor portion 28, a third conveyor portion 30, a fourth conveyor portion 32, a fifth conveyor portion 34, and a sixth conveyor portion 36. As seen in the drawings, conveyor portions 28, 32, 34 and 36 are inclined while conveyor portions 26 and 30 are generally horizontally disposed. For purposes of description, first conveyor portion 26 will be described as having a first end 38 and a second end 40. Second conveyor portion 28 will be described as having an upper end and a lower end. Third conveyor portion 30 will be described as having a first end 42 and a second end 44. Fourth conveyor portion 32 will be described as having a lower end and an upper end while fifth conveyor portion 34 will be described as having a first end 46 and a second end 48. Sixth conveyor portion 36 will be described as having an upper end and a lower end.

Figure 6:
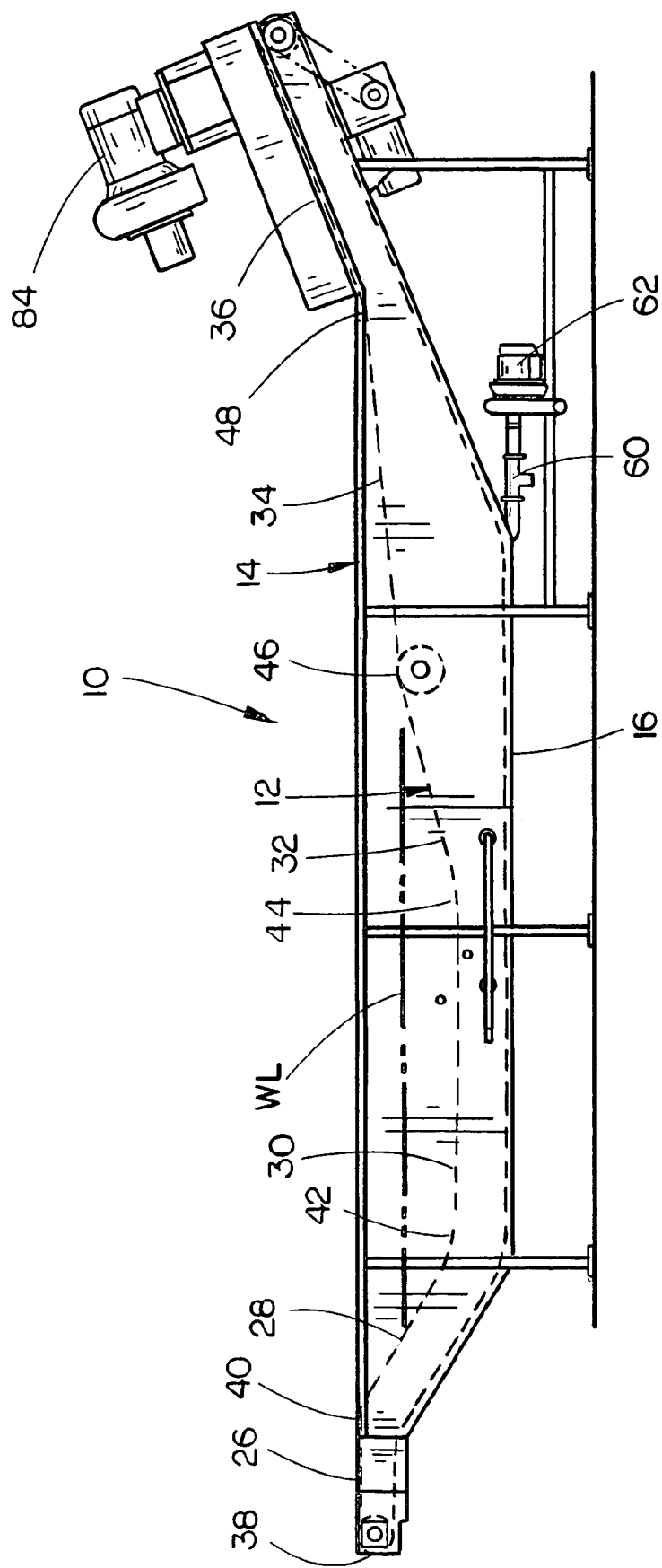
FIG. 6 is a side view of the conveyor illustrating the various portions thereof.

As seen in FIG. 6, conveyor portion 28 extends downwardly from second end 40 of conveyor portion 26 to first end 42 of conveyor portion 30. As seen, conveyor portion 32 extends upwardly from second end 44 of conveyor portion 30 to first end 46 of conveyor portion 34. Conveyor portion 34 extends slightly upwardly to first end of conveyor portion 36. As also seen, sixth conveyor portion 36 extends upwardly from the second end 48 of conveyor portion 34. Conveyor 12 is mounted on horizontally extending shafts which extend between side walls 22 and 24 and which are mounted in suitable bearings. Conveyor 12 has a width which is just slightly less than the width of the housing 14. Conveyor 12 is driven by any convenient means such as an electric motor in conventional fashion.

The numeral 50 refers to a tower which has a filter 52 at the upper end thereof and a water chiller 54 of conventional design mounted below the filter 52. Water chiller 54 is supplied with water under pressure by means of a line 56 extending from a suitable and conventional water source 58. The numeral 60 refers to a water return line which extends from pump 62 to filter 52, with the pump 62 being imposed in line 64 which is in communication with the interior of the housing 14.

Figure 4:
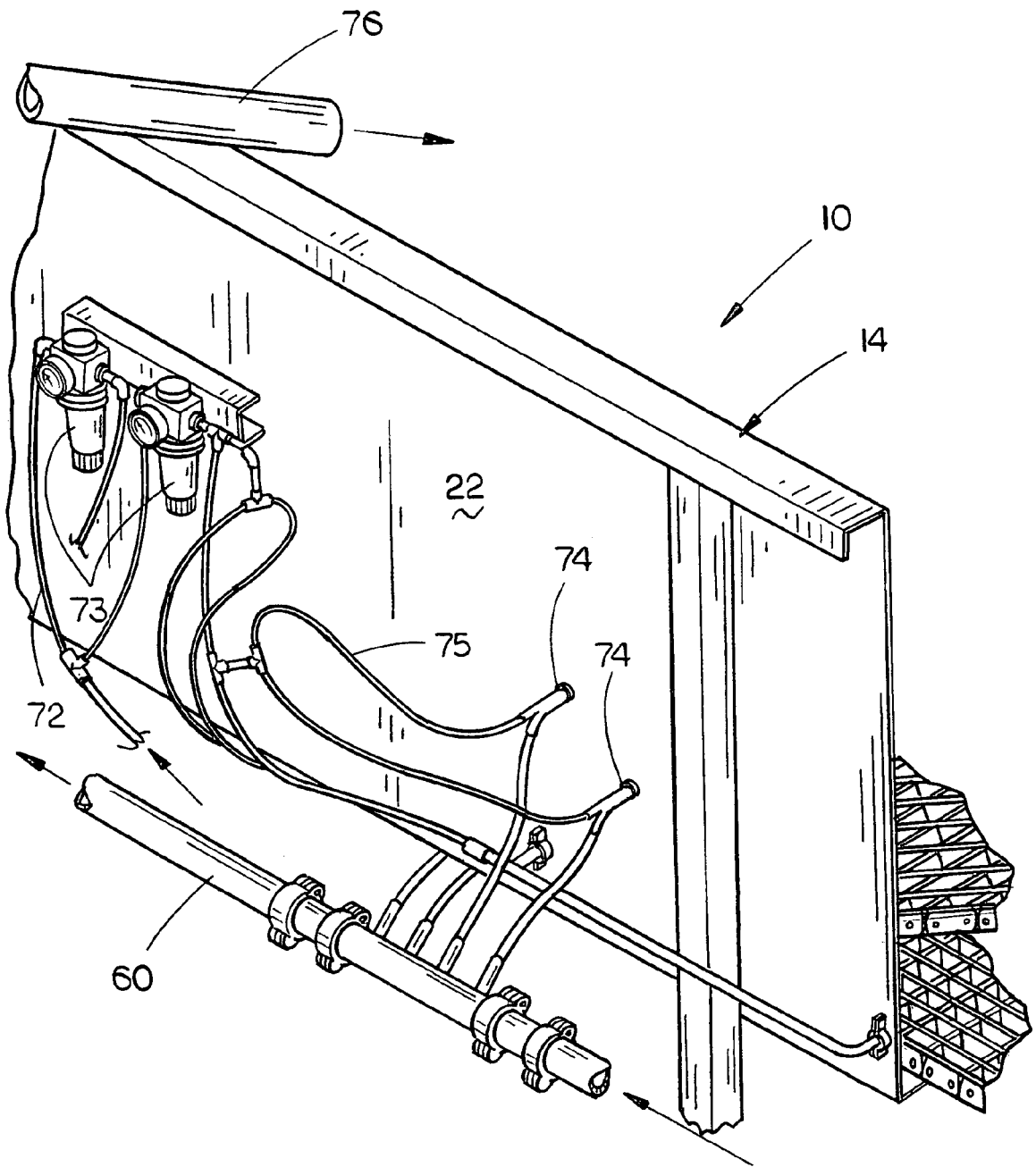
FIG. 4 is a partial side perspective view of the housing of the system.
Figure 5:
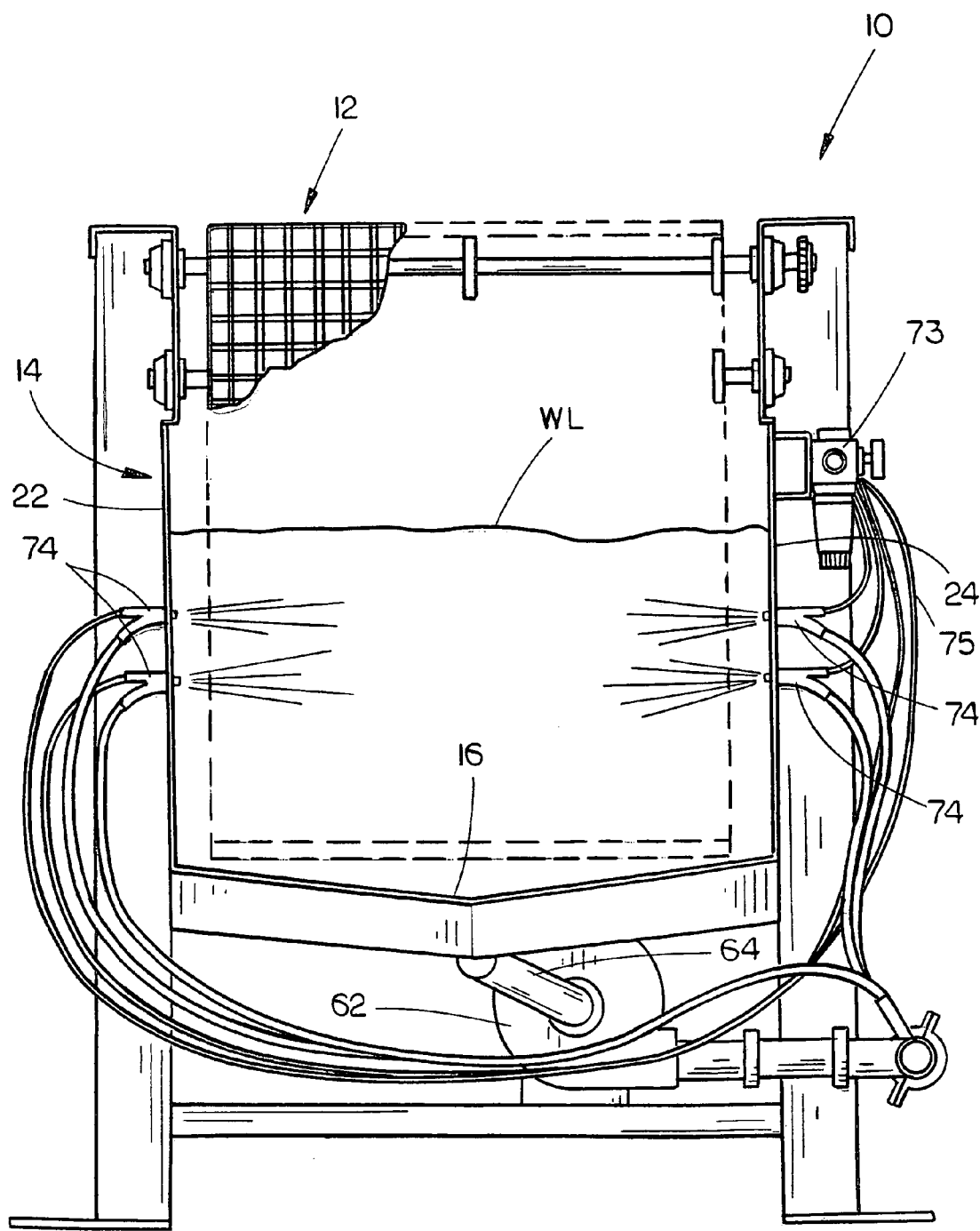
FIG. 5 is a sectional view of the housing of the system.

The numeral 70 refers to a source of air under pressure which is in communication with a plurality of air lines 72 which extend towards the housing 14 for connection to pressure regulator 73. The numeral 74 refers to a plurality of spaced-apart air/water injector nozzles which are positioned in the side walls 22 and 24 and which are fluidly connected to the pressure regulator 73 by lines 75 and which are also in communication with the water line 60 which extends from the pump 62 to the filter 52 (FIG. 4). The numeral 76 refers to a water line extending from the chiller 54 to the housing 14.

The numeral 78 refers to a chute or hopper-like device positioned above conveyor portion 26 which is adapted to direct the pieces of meat 80 falling from an infeed conveyor 82 onto the conveyor portion 26. The numeral 84 refers to an air blower which is positioned above conveyor portion 36 for blowing water from the pieces of meat 80 traveling up the conveyor portion 36 towards the outfeed conveyor 86.

In operation, replenishment water is furnished to the water chiller 54 by the source of water 58. The pieces of meat 80 are supplied to the hopper 78 which is positioned over the conveyor portion 26 so that the pieces of meat 80 drop from the discharge end of the conveyor 80 onto the moving conveyor portion 26. The pieces of meat 80 travel downwardly onto the conveyor portion 28 and are immersed in the water inasmuch as the water level WL is above the conveyor portion 30. The air/water injection into the housing 14 by the injection nozzles 74 agitate the water which surrounds the pieces of meat 80 as they travel on the conveyor portion 30 beneath the water level WL within the housing 14 with the agitated water removing foreign material therefrom such as bone chips, blood clots or skin. Many of those foreign material particles will fall through the conveyor 12 to the bottom of the housing 14. After the pieces of meat 80 have been subjected to the agitated water to remove the foreign material therefrom, the pieces of meat 80 travel upwardly on the conveyor portion 32 to the conveyor portion 34 and then upwardly on the conveyor portion 36. The air blower 84 directs forced air onto the pieces of meat 80 on the conveyor portion 36 to remove excess water therefrom with that water passing through the conveyor 12 downwardly to the bottom of the housing. The pieces of meat 80 are then discharged from the outlet or discharge end of the conveyor portion 36 onto the outfeed conveyor 86 for further processing.

The water is recirculated or recycled from the housing 14 by means of the pump 62 which draws the water, bone chips, blood clots, and skin therethrough and forces the same through the pipe 60 to the upper end of the filter 52 which removes the foreign material from the water. The filtered water passes through the lower end of the filter 52 into the water chiller 54 which chills the water to the desired temperature for discharge therefrom through the pipe or conduit 76 into the interior of the housing 14. If any replenishment water is needed in the water chiller 54, the same is supplied thereto from the source of water 58 through the pipe or conduit 56.

Although six conveyor portions have been described as comprising portions of the conveyor 12, the conveyor 12 is endless and the conveyor 12 could have many different conveyor portions as long as at least a portion of the conveyor 12 is positioned below the water level WL in the housing 14 so that the agitated water in the housing 14 may be directed onto the pieces of meat 80 for at least a portion of their travel on the conveyor 12 so as to remove the foreign particles therefrom.

Thus it can be seen that the invention accomplishes at least all of its stated objectives.

We claim:

1. A meat processing system, comprising:

an elongated housing having a first end and a second end;

said housing including a bottom wall and horizontally spaced-apart side walls extending upwardly from said bottom wall;

said housing being filled to a predetermined level with water;

an endless belt conveyor having opposite side edges, an input end and an output end, movably mounted in said housing which extends between said first and second ends of said housing;

said side edges of said belt conveyor being positioned adjacent said side walls of said housing;

said belt conveyor including at least:

(a) a first conveyor portion, having first and second ends, at said first end of said housing which is positioned above the water level in said housing so that pieces of meat may be placed thereon;

(b) a second conveyor portion, having first and second ends, extending downwardly from said second end of said first conveyor portion into the water in said housing and towards said second end of said housing;

(c) a third conveyor portion, having first and second ends, extending from said second end of said second conveyor portion, below the water level in said housing, towards said second end of said housing;

(d) and a fourth conveyor portion, having first and second ends, extending upwardly from said third conveyor portion towards said second end of said housing;

said fourth conveyor portion having an upper end portion which is positioned above the water level in said housing;

each of said conveyor portions having carry and return portions;

said endless belt conveyor being movable so that pieces of meat placed on said first conveyor portion will be conveyed downwardly into said water in said housing, through the water in said housing by said endless belt conveyor;

an air blower positioned above said second end of said housing which blows excess water downwardly from the pieces of meat after the meat has been moved upwardly from the water in said housing by said conveyor with the excess water being returned to the water in said housing;

a water agitator associated with said housing to at least agitate the water adjacent said third conveyor portion so as to remove foreign material from the pieces of meat positioned on said carry portion of said third conveyor portion.

2. The system of claim 1 further including a chiller for chilling the water in said housing.

3. The system of claim 2 further including a water recirculator which recirculates chilled water in said housing.

4. The system of claim 3 further including a water filter for filtering out foreign material from the recirculated water.

5. The system of claim 1 wherein said water agitator includes water nozzles positioned on said housing which direct pressurized water onto the pieces of meat being conveyed by said conveyor through the water in said housing.

6. The system of claim 5 wherein the pressurized water is chilled.

7. The system of claim 6 wherein the water agitator also includes pressurized air.

8. The system of claim 1 wherein a fifth conveyor portion is positioned at the second end of said fourth conveyor portion and wherein said fifth conveyor portion extends upwardly towards said second end of said housing and which is positioned above the water level in said housing and wherein said air blower is positioned above said fifth conveyor portion.

* * * * *